Feb. 27, 1968   W. J. MELTON   3,370,464
LIQUID FLOW METER
Filed Dec. 13, 1965
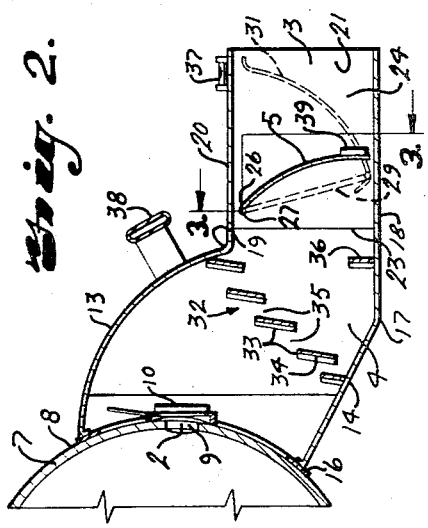
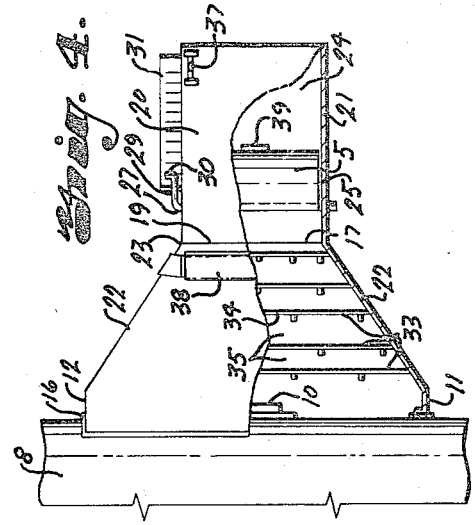
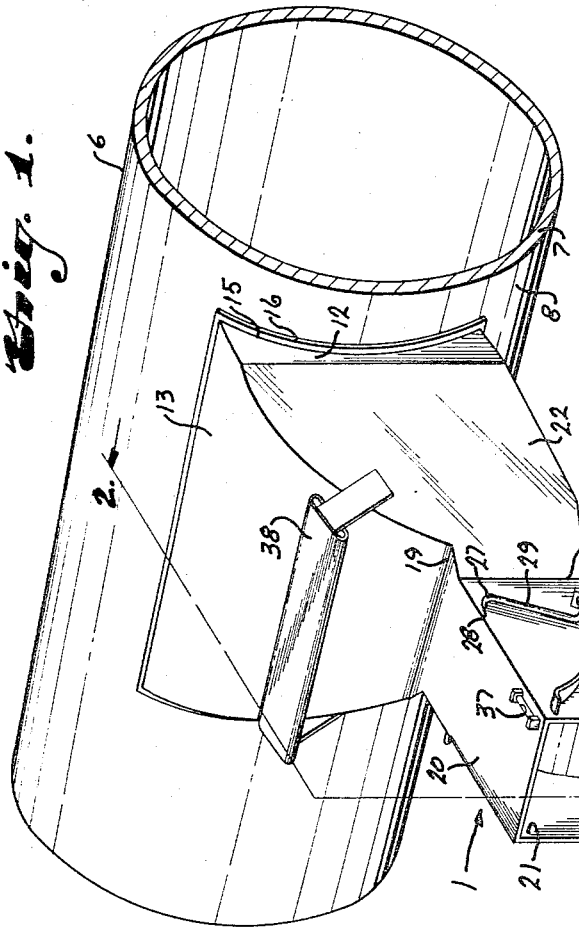
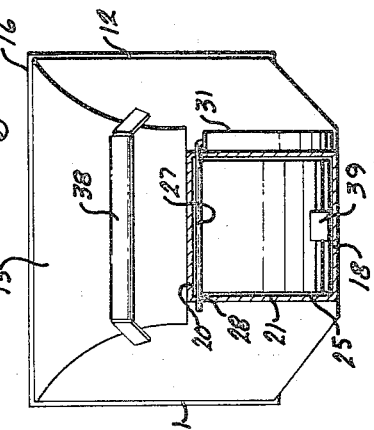
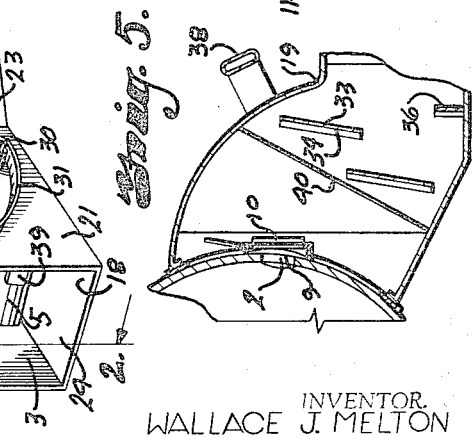
INVENTOR.
WALLACE J. MELTON
BY
Fishburn and Gold
ATTORNEYS

United States Patent Office 3,370,464
Patented Feb. 27, 1968

3,370,464
LIQUID FLOW METER
Wallace J. Melton, 860 Sunset Drive,
Colby, Kans. 67701
Filed Dec. 13, 1965, Ser. No. 513,373
5 Claims. (Cl. 73—228)

ABSTRACT OF THE DISCLOSURE

A direct reading portable liquid flow meter for use in measuring liquid discharged from a duct opening, said meter having a hollow shell with an inlet end and an outlet end and a through flow passage therebetween. The shell is divided into a tapered flow diffusing portion and a horizontal flow measuring portion with a plurality of baffles mounted in the diffusing portion of the shell and extending transversely of the flow therethrough. The baffles are positioned in spaced, staggered, overlapped relation whereby all liquid entering the shell is deflected downwardly by a baffle upstream from the horizontal flow measuring portion. A vane is fixed to and depends from a rotatable shaft mounted in bearing means on walls of the flow measuring portion of the shell. An end of the rotatable shaft extends from the shell and has a flow rate indicator means fixed thereto.

---

In irrigation of crops it is common practice to flow water from irrigation wells or other suitable source through pipes or ducts to areas of use wherein the pipe or duct has a gate controlled opening for discharge of water from the pipe or duct whereby the water may move through channels, ditches, laterals, or other suitable flow way, in the distribution to the crops to be irrigated. It is desirable to be able to measure the quantity of water discharged from the gate in order to determine the amount of water received and distributed. And also, in order to determine that the rate is that which is desired for suitable distribution.

The principal objects of the present invention are to provide a portable flow measuring device engageable with a pipe or duct surface in surrounding relation to a gate controlled opening thereof with said device having an indicator responsive to flow of liquid through the device to indicate the rate of liquid discharge from the gate; to provide such a measuring device with a horizontal flow portion at which the flow is measured; to provide such a structure with a liquid diffusing and/or turbulence reducer between the inlet and the flow responsive device assuring substantially level flow past the flow responsive member; to provide such a structure with a visible level indicator whereby the position of the meter can be adjusted relative to the gate to correct flow position; and to provide a portable liquid flow meter that is easily applied and positioned relative to a pipe gate whereby the flow therefrom passes through the meter and is measured thereby said meter being of sturdy light weight construction and capable of providing substantially accurate measurement of flows therethrough.

Other objects and advantages of this invention will become apparent from the following description taken in connection with the accompanying drawings wherein are set forth by way of illustration and example certain embodiments of this invention.

FIG. 1 is a perspective view of a flow meter applied to a flow pipe to show the manner of use.

FIG. 2 is a vertical sectional view through the flow meter and pipe taken on the line 2—2, FIG. 1.

FIG. 3 is a sectional view through the flow meter taken on the line 3—3, FIG. 2.

FIG. 4 is a plan view of the flow meter.

FIG. 5 is a partial sectional view through the flow meter showing a modified form of liquid diffuser.

Referring more in detail to the drawings:

The reference numeral 1 generally designates a liquid flow meter having an inlet end 2 and an outlet end 3 and adapted for flow therethrough. The flow meter has a flow portion 4 with a flow responsive member or flap 5 therein for indicating the rate of flow of the liquids through the flow passage or portion. The meter is particularly adapted to be used with flow pipes or ducts 6 having a wall 7 with an outer surface 8 surrounding gate controlled opening 9 whereby when the controlling gate member 10 is moved to open position liquid in the pipe 6 can flow through the opening 9 for delivery to a point of use, as for example, to areas to be irrigated by means of ditches, laterals, channels, or the like, which receive the liquid discharged through the gate opening 9.

In the structure illustrated the meter 1 is a hollow duct like structure with walls made of sheet metal or other suitable material, as for example, plastic for lightness in weight. The portion adjacent the inlet end 2 is preferably enlarged and has opposed side walls 11 and 12, a top wall 13, and a bottom wall 14, the end edges 15 of which are shaped to substantially conform to portions of the surface 8 of the pipe 6 around the gate opening 9. The edges 15 are preferably covered with a resilient seal member 16 to provide a seal between the inlet end of the meter and the surface 8 of the pipe.

The bottom wall 14 slopes downwardly and outwardly and connects as at 17 with a substantially horizontal bottom wall portion 18 that extends to the outlet end 3. The top wall 13 curves downwardly and outwardly and connects as at 19 with a substantially horizontal top wall 20 which is preferably substantially parallel with the bottom wall portion 18 adjacent to the outlet end 3. The flow metering portion 4 preferably has parallel side walls 21 whereby said flow portion is of substantially uniform cross-section.

The side walls 11 and 12 at the inlet end portion of the meter are connected by inwardly converging portions 22 with the side wall portions 21 as at 23 and from that point on toward the outlet end 3 the flow passage 24 defined by the walls 18, 20 and 21 is substantially uniform in interior cross-section. With this arrangement the inlet end of the meter is substantially larger than the gate opening 9 and while the outlet end 3 is reduced relative to the inlet end, it is still substantially larger in cross-sectional area than the gate opening 9 in order to assure that the flow being measured can only partially fill the flow metering passage.

The vane or flap 5 is thin-walled and extends transversely of the passage 24 with the edges 25 in close proximity to the inner surfaces of the top side and bottom walls 20, 21 and 18 respectively. The upper edge 26 of the vane is fixed relative to a pivotal mounting member 27 for swingably mounting the vane or flap 5 whereby in the flow of liquid through the meter passage 24 the lower portion of the vane will swing toward the outlet end 3 of the meter. While the pivotal mounting of the vane 5 may be by any suitable manner, in the structure illustrated, it consists of a pin extending through bearing openings 28 in the side walls 21 of the flow meter portion 4. One end of the pin extends exteriorly of a bearing opening and then is turned generally downwardly to form an indicator arm 29 adjacent to and exteriorly of a side wall 21. Preferably the lower end of the arm 29 is turned outwardly to provide a portion 30 adapted to move in proximity to a calibrated scale member 31 fixed on said wall. The scale member 31 is in an arc from the axis of the pivot member 27 so that the portion 30 will move by the calibrations and its position will indicate the flow of liquid past the vane 5 in a suitable measure as for example, in gallons per minute.

A liquid diffusing means 32 is arranged between the inlet end 2 and the vane 5 so as to prevent any stream of water or liquid from the gate being jetted against the vane or flap. In the structure illustrated in FIGS. 1 to 4, inclusive, the diffusing means 32 consists of a plurality of baffles 33 fixed to the side wall portions 22 and extending transversely to the flow of the meter. The baffles are staggered or offset whereby said baffles are in spaced planes but adjacent edges of adjacent baffles overlay so that there is a continued surface exposed toward the inlet end 2 and no liquid can pass from the inlet end to the flow meter portion 4 without striking a baffle surface 34. In the arrangement shown the water from the gate opening 9 impinges against the baffle surfaces 34 is then directed downwardly through spaces 35 between baffles to the bottom portion where it can flow under lower edges of the baffles in a level flow toward the outlet end 3. A short baffle or weir 36 is secured to the bottom wall 18 between the diffusing means 32 and the flow passage 24 whereby the water after striking the baffles 33 passes downwardly toward the bottom wall and then flows in substantially level flow through the passage portion 24. The baffle 36 tends to eliminate any cascades or velocity from the drop in level so as to assure volume reading that is accurate.

A visual level indicator such as a bubble vial 37 is mounted on the meter preferably on the top wall portion 20 adjacent the outlet end 3. A handle 38 is secured to the meter intermediate its ends to facilitate positioning and holding the inlet end 2 against the pipe surface 8 to form a seal around the gate opening and also the movement up or down until the level bubble indicates that the meter is in proper position for substantially level flow through the measuring portion of the meter. The vane or flap 5 preferably has a weight 39 on the lower portion whereby it will provide suitable flow resistance and be properly responsive to the flow of the water or liquid passing thereunder to swing the indicator arm 29 whereby the portion 30 will accurately indicate the rate of liquid flow through the meter.

It is believed that with this arrangement both the hydrostatic and dynamic pressure exerted by the flowing stream are properly utilized to cause swinging movement of the vane 5 and the diffuser serves to damper the turbulence which might otherwise cause inaccuracies in the reading.

In the structure shown in FIG. 5 a modified form of flow retarder or diffuser is illustrated. In this form of the invention a screen 40 is positioned upstream from baffles 33 whereby the baffles and screen cooperate to break up the high velocity jet issuing from the gate opening 9 so that only a level water flow will move the vane and swing same and the indicator arm to indicate the rate of liquid flow passing thereunder.

It is to be understood that while I have illustrated and described certain forms of my invention it is not to be limited to the specific forms or arrangement of parts herein described and shown except insofar as such limitations are included in the claims.

What I claim and desire to secure by Letters Patent is:

1. A direct reading portable liquid flow meter for use in measuring liquid discharge from a duct opening comprising,
   (a) a hollow shell having an inlet end and an outlet end with a through passage therebetween,
   (b) means at the inlet end of said shell adapted to conform to the configuration of the surface of the duct surrounding the discharge opening thereof whereby flow from said opening will be through the passage of the shell,
   (c) said shell passage having a tapered flow diffusing portion and a flow measuring portion of substantially uniform cross-section adapted to be positioned for substantially uniform flow of liquid therethrough,
   (d) a vane positioned in said flow measuring portion transversely thereof,
   (e) means pivotally mounting said vane whereby a portion of said vane is swingable toward the outlet end of the shell in response to flow of liquid by said vane,
   (f) indicator means operatively connected with the vane and responsive to displacement thereof for indicating the flow of liquid thereby,
   (g) and a plurality of baffles in said flow diffusing portion of said shell extending transversely of the flow therethrough, said baffles being in spaced, staggered, overlapped relation whereby all liquid entering said shell is deflected downwardly by a baffle upstream from said flow measuring portion.

2. A flow meter as set forth in claim 1 wherein said flow measuring portion is horizontal and at a generally lower level than said inlet end, said meter having a handle means for holding the inlet end against a flow duct, and the mounting means of the vane is a rotatable shaft mounted in bearing means on the walls of the shell with an end of the shaft extending from the shell and having the flow rate indicator means fixed thereto, said vane is curved downwardly from said shaft with a weighted lower portion for resisting swinging movement thereof.

3. The flow meter as set forth in claim 1 wherein:
   (a) said shell has walls defining an inlet end substantially larger than said outlet end with said walls converging from adjacent said inlet end toward said outlet end to a horizontal flow measuring portion that is of substantially uniform interior cross-section to said outlet end of said shell with said horizontal measuring flow portion being at a generally lower level than the inlet portion of the shell,
   (b) a visual level indicator is mounted on said meter adjacent said outlet end to indicate level condition of the horizontal flow measuring portion,
   (c) said meter has a handle means for holding the inlet end against a flow duct,
   (d) a resilient member is mounted on said inlet end and resiliently and sealingly engages the surface of the flow duct in surrounding relation to the discharge opening when held thereagainst,
   (e) the mounting means of the vane is a rotatable shaft mounted in bearing means on the walls of said shell with an end of the shaft extending from the shell and having the flow rate indicator means fixed thereto, and
   (f) said vane is curved downwardly from said shaft with a weighted lower portion for resisting swinging movement thereof.

4. A flow meter as set forth in claim 1 wherein said flow meter shell has a planar bottom wall including:
   (a) a weir mounted on said bottom wall of said shell, said weir being positioned between said baffles and said flow measuring vane whereby said weir provides uniform level flow from said baffles to said vane by eliminating velocity due to said flow measuring portion being at a lower level than said flow diffusing portion.

5. The flow meter as set forth in claim 1 including:
(a) screen means mounted in said flow diffusing portion and positioned transversely of the flow therethrough, said screen means being positioned between said duct opening and said baffles whereby said screen means and said baffles cooperate to break up a high velocity jet issuing from said duct opening.

References Cited
UNITED STATES PATENTS

| | | | |
|---|---|---|---|
| 1,177,480 | 3/1916 | Callan | 73—228 |
| 2,623,544 | 12/1952 | Waters et al. | 73—422 X |
| 2,694,301 | 11/1954 | Boyer | 66—86 |
| 3,178,944 | 4/1965 | Templeton | 73—420 |

FOREIGN PATENTS

| | | |
|---|---|---|
| 149,237 | 12/1962 | Russia. |

RICHARD C. QUEISSER, *Primary Examiner.*

E. D. GILHOOLY, *Assistant Examiner.*